(12) United States Patent
Sparling

(10) Patent No.: US 8,020,711 B2
(45) Date of Patent: Sep. 20, 2011

(54) CONTROLLER RETAINER FOR A VIDEO GAME REMOTE CONTROLLER ASSEMBLY

(76) Inventor: Mark W. Sparling, Venice, CA (US)

( * ) Notice: Subject to any disclaimer, the term of this patent is extended or adjusted under 35 U.S.C. 154(b) by 1039 days.

(21) Appl. No.: 11/824,621

(22) Filed: Jul. 2, 2007

(65) Prior Publication Data

US 2008/0001355 A1  Jan. 3, 2008

Related U.S. Application Data

(60) Provisional application No. 60/818,206, filed on Jul. 3, 2006.

(51) Int. Cl.
*A47F 7/00* (2006.01)
(52) U.S. Cl. .................................................. 211/26.1
(58) Field of Classification Search ............. 211/26.1, 211/10, 11, 13.1; 463/47, 37; D21/333; D14/433, 434; 273/148 B
See application file for complete search history.

(56) References Cited

U.S. PATENT DOCUMENTS

| | | | | |
|---|---|---|---|---|
| 4,050,659 A | * | 9/1977 | McCannon et al. | 248/636 |
| 4,312,507 A | * | 1/1982 | Smith et al. | 273/237 |
| 4,422,640 A | * | 12/1983 | Tamarkin | 463/47 |
| 4,480,835 A | * | 11/1984 | Williams | 273/148 B |
| 4,494,754 A | | 1/1985 | Wagner, Jr. | |
| D279,845 S | * | 7/1985 | Holliman | D14/457 |
| 4,530,504 A | * | 7/1985 | Long, Jr. | 273/148 B |
| 4,573,682 A | * | 3/1986 | Mayon | 273/148 B |
| 4,635,496 A | * | 1/1987 | McTyre | 74/471 XY |
| 4,648,603 A | * | 3/1987 | Hayford, Jr. | 273/148 B |
| 4,852,746 A | * | 8/1989 | Wells et al. | 211/26.1 |
| 4,893,222 A | * | 1/1990 | Mintzer | 362/109 |
| 4,991,817 A | * | 2/1991 | VonKleist et al. | 248/676 |
| D320,018 S | * | 9/1991 | Bakanowsky, III | D14/172 |
| 5,046,739 A | * | 9/1991 | Reichow | 273/148 B |
| 5,059,958 A | * | 10/1991 | Jacobs et al. | 345/158 |
| 5,127,615 A | * | 7/1992 | Jones | 248/172 |
| 5,168,969 A | * | 12/1992 | Mayhew | 191/12.2 R |
| 5,207,791 A | * | 5/1993 | Scherbarth | 273/148 B |
| D338,053 S | | 8/1993 | Underhill et al. | |
| 5,244,173 A | * | 9/1993 | Kulyk | 248/176.1 |
| 5,501,458 A | | 3/1996 | Mallory | |
| 5,645,277 A | * | 7/1997 | Cheng | 273/148 B |
| 6,120,025 A | | 9/2000 | Hughes, IV | |
| D435,871 S | * | 1/2001 | Yu | D21/333 |
| 6,241,247 B1 | * | 6/2001 | Sternberg et al. | 273/148 B |

(Continued)

*Primary Examiner* — Sarah Purol
(74) *Attorney, Agent, or Firm* — Roeder & Broder LLP; James P. Broder

(57) ABSTRACT

A controller retainer (14) for a video game controller (12) includes a retainer top (20), a retainer bottom (22), a first side (24), a second side (26), a retainer back (28) and a retainer front (30). The retainer top (20) includes a controller receiver (34) that receives the controller (12). The first side (24) and the second side (26) extend between the retainer top (20) and the retainer bottom (22). The second side (26) can be non-parallel to the first side (24). At least one of the sides (24, 26) can form an angle (44, 48) that is greater than 90 degrees relative to the retainer bottom (22). At least one of the sides (24, 26) can form an angle (250, 254) that is less than 90 degrees relative to the retainer back (28). The retainer bottom (22) can include a first surface (36) and a second surface (38) that is positioned at an angle greater than 90 degrees relative to the first surface (36). The controller receiver (14) can include one or more cavities (358) that each substantially encircles at least a portion of the controller (12).

23 Claims, 3 Drawing Sheets

U.S. PATENT DOCUMENTS

| | | | |
|---|---|---|---|
| D461,509 S * | 8/2002 | Yu | D21/333 |
| D462,398 S * | 9/2002 | Hussaini et al. | D21/333 |
| D464,626 S * | 10/2002 | Ashida et al. | D13/147 |
| D465,532 S * | 11/2002 | Hussaini et al. | D21/333 |
| D467,621 S * | 12/2002 | Ku | D21/333 |
| 6,520,501 B1 * | 2/2003 | Naghi et al. | 273/148 B |
| 6,530,570 B2 * | 3/2003 | Ku | 273/148 B |
| 6,530,838 B2 * | 3/2003 | Ha et al. | 463/36 |
| D489,416 S * | 5/2004 | Chao | D21/333 |
| D494,227 S * | 8/2004 | Hussaini et al. | D21/392 |
| D494,634 S * | 8/2004 | Soga | D21/333 |
| 6,811,491 B1 * | 11/2004 | Levenberg et al. | 463/47 |
| D507,273 S * | 7/2005 | Ibuki | D14/433 |
| 6,923,443 B1 | 8/2005 | Hughes, IV | |
| 7,063,321 B2 | 6/2006 | Hussaini et al. | |
| D563,482 S * | 3/2008 | DuBois et al. | D21/385 |
| D568,411 S * | 5/2008 | Navid et al. | D21/333 |
| D575,350 S * | 8/2008 | Ashida et al. | D21/333 |
| D602,096 S * | 10/2009 | Ashida et al. | D21/333 |
| D610,625 S * | 2/2010 | Guinchard et al. | D21/333 |
| D615,131 S * | 5/2010 | Biheller | D21/333 |
| D622,724 S * | 8/2010 | Burke et al. | D14/400 |
| 2004/0180720 A1 * | 9/2004 | Nashi et al. | |
| 2006/0201895 A1 * | 9/2006 | Jackson | 211/13.1 |
| 2006/0279039 A1 * | 12/2006 | Krieger et al. | 273/148 B |
| 2009/0325717 A1 * | 12/2009 | Lee-Him | 463/47 |

* cited by examiner

CONTROLLER RETAINER FOR A VIDEO GAME REMOTE CONTROLLER ASSEMBLY

RELATED APPLICATION

This application claims domestic priority under 35 U.S.C. §119(e) from U.S. Provisional Patent Application Ser. No. 60/818,206, filed Jul. 3, 2006, the entire contents of which are expressly incorporated herein by reference to the extent permitted.

BACKGROUND

In-home versions of video game systems continue to increase in popularity. Home video game systems generally include a game console coupled to a television monitor and one or more video game remote controllers connected to the console which permit user interaction with a game being played. Many video game systems are sold with video game remote controllers that are connected to the console through a hard-wire link. More recently, wireless video game remote controllers have been developed which provide players with more freedom of movement. Such wireless controller accessories replicate the basic control features found on conventional hard-wired controllers but use infrared (IR), radio frequency (RF) or other electromagnetic radiation to send signals to the console.

People of all ages can sit, stand or lie down while operating a video game remote controller that includes a plurality of push-buttons, joysticks, wheels, dials, switches and/or other types of control mechanisms. To skillfully operate a video game remote controller, fast, repetitive finger and hand movements are required. Unfortunately, the somewhat awkward configuration of the video game remote controller can cause a user's fingers, hands, wrists, arms and/or shoulders to become fatigued or even injured during or after a play session. Additionally, the positioning of the video game remote controller relative to the user's body can result in poor posture by the user, which can cause back and/or neck aches, as well as other types of pain and discomfort.

SUMMARY

The present invention is directed toward a controller retainer for a video game controller. In one embodiment, the controller retainer includes a retainer top, a retainer bottom, a first side and a second side that is opposite the first side. In this embodiment, the retainer top includes a controller receiver that receives the video game controller. The retainer bottom is opposite the retainer top. The first side can be substantially planar and extends between the retainer top and the retainer bottom. The second side can be substantially planar and extends between the retainer top and the retainer bottom. The second side is spaced apart from the first side. In one embodiment, the second side is non-parallel relative to the first side. In some embodiments, at least one of the first side and the second side forms an angle that is greater than 90 degrees relative to the retainer bottom.

The controller retainer can also include a retainer back that extends between the first side and the second side. In this embodiment, the retainer back is positioned away from the controller receiver, and extends between the retainer top and the retainer bottom. The retainer back can form an angle with at least one of the first side and the second side that is less than 90 degrees. The controller retainer can also include a retainer front that extends between the first side and the second side and is positioned adjacent to the controller receiver. In some embodiments, the retainer front extends between the retainer top and the retainer bottom, and forms an angle with at least one of the first side and the second side that is greater than 90 degrees.

In another embodiment, the retainer bottom includes a first surface and an adjacent, substantially planar second surface. In certain embodiments, the second surface is positioned at an angle that is greater than 90 degrees relative to the first surface.

In certain embodiments, the controller receiver includes one or more cavities that each substantially encircles at least a portion of the controller. In another embodiment, the controller retainer has a retainer height measured in a first direction between the retainer top and the retainer bottom. The controller receiver has a receiver height measured in the first direction that is less than approximately 50% of the retainer height.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
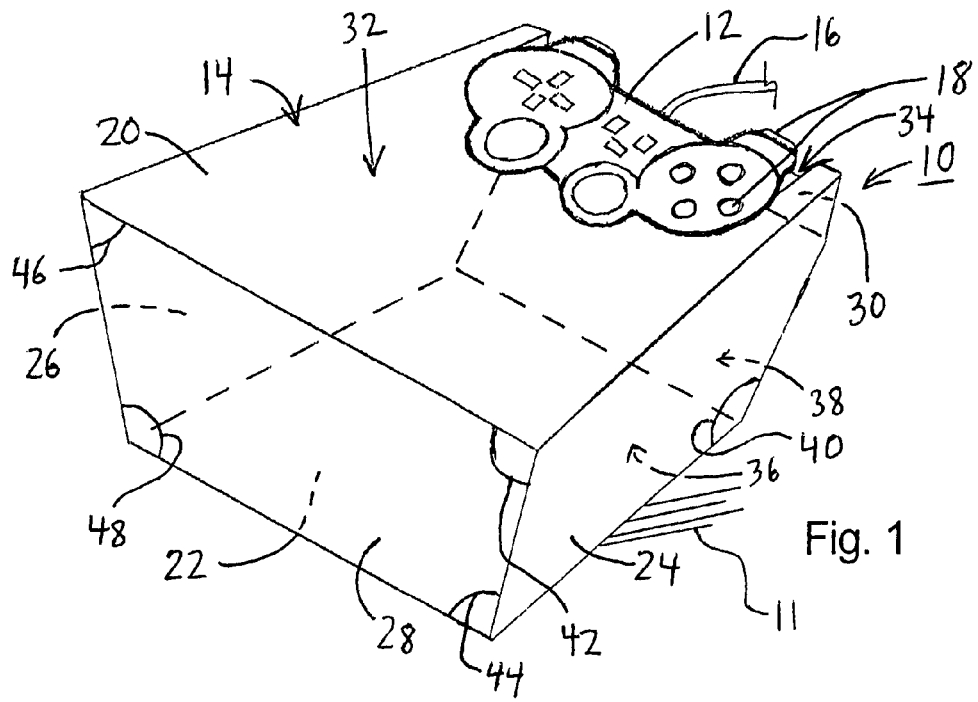
FIG. 1 is a perspective view of a support surface and one embodiment of a video game remote controller assembly having features of the present invention, including a video game remote controller and a controller retainer.

FIG. 1 is a perspective view of one embodiment of a video game remote controller assembly 10 (sometimes referred to herein as a "controller assembly") positioned on a support surface 11. As used herein, the support surface 11 can be any surface that supports the controller assembly, such as a table, a floor, the lap of a user, or any other suitable surface.

The design of the controller assembly 10 can be varied. In the embodiment illustrated in FIG. 1, the controller assembly 10 includes a video game remote controller 12 (sometimes referred to herein as a "controller") and a controller retainer 14. In FIG. 1, the controller retainer 14 is partially illustrated in phantom to more easily identify the structures that form the controller retainer 14.

The controller 12 remotely controls on-screen movements of video objects during play of a video game by a user. The shape and size of the controller 12 can vary to suit the design requirements of the controller assembly 10. The controller 12 can include an electrical connector 16 and one or more switches 18. The connector 16 electrically connects the controller 12 to a console (not shown) or to a video display device (not shown) to facilitate transmission of electrical signals between the controller 12 and the console and/or video display device. Alternatively, the controller can wirelessly send signals to the console and/or video display device by using IR, RF or other electromagnetic radiation, as non-exclusive examples. The switches 18 can include various types of actuators such as pushbuttons, joysticks, wheels, dials and/or other types of control mechanisms that are used to control various aspects of the video game being played.

The controller retainer 14 retains the controller 12. The size and shape of the controller retainer 14 can be varied to suit the design requirements of the controller 12. In the embodiment illustrated in FIG. 1, the controller retainer includes a retainer top 20, a retainer bottom 22 (illustrated in phantom), a first side 24, a second side 26 (illustrated in phantom), a retainer back 28 and a retainer front 30 (illustrated in phantom).

The retainer top 20 retains and positions the controller 12 so that the controller 12 is visible to and/or faces the user during play. The retainer top 20 extends between the first side 24 and the second side 26, and between the retainer back 28 and the retainer front 30. In the embodiment illustrated in FIG. 1, the retainer top 20 includes a substantially planar top surface 32 and a controller receiver 34. Alternatively, the top surface 32 of the retainer top 20 can have a non-planar configuration. In non-exclusive alternative embodiments, for example, the top surface 32 can be concave, convex, ridged, or the top surface can combine two or more of these types of configurations. Still alternatively, the top surface 32 can have any other suitable configuration.

The controller receiver 34 can include a cutout, indentation, depression or other configuration so that the controller receiver 34 receives the controller 12. In certain embodiments, the controller receiver 34 securely positions the controller 12 so that movement of the controller 12 relative to the controller retainer 14 during use is at least partially, if not fully, inhibited.

The retainer bottom 22 is generally on an opposing side of the controller retainer 14 from the retainer top 20. The retainer bottom 22 extends between the first side 24 and the second side 26, and between the retainer back 28 and the retainer front 30. In the embodiment illustrated in FIG. 1, the retainer bottom 22 includes a first bottom surface 36 (illustrated in phantom) and an adjacent second bottom surface 38 (illustrated in phantom). The first bottom surface 36 can rest on the user during play when the user is in a seated position or another suitable position. In one embodiment, the first bottom surface 36 is substantially planar and is substantially parallel to the top surface 32. Alternatively, the first bottom surface 36 can be non-planar and/or non-parallel to the top surface 32.

In this embodiment, the second bottom surface 38 is angled relative to the first bottom surface 36. For example, the second bottom surface 38 can be positioned at an angle 40 that is greater than 90 degrees and less than 180 degrees relative to the first bottom surface. In various non-exclusive examples, the second bottom surface 38 can be positioned at an angle relative to the first bottom surface 36 that is less than 180 degrees, but is at least approximately 100, 120, 135, 150 or 170 degrees. Still alternatively, the second bottom surface 38 can be positioned at an angle relative to the first bottom surface 36 that is less than or equal to 90 degrees, or greater than or equal to 180 degrees. In certain embodiments, the second bottom surface 38 provides a more comfortable surface for the user's hands while using the controller, as described in greater detail below.

In the embodiment illustrated in FIG. 1, the first side 24 extends between the retainer top 20 and the retainer bottom 22. In one embodiment, the first side 24 can be substantially planar. Alternatively, the first side 24 can have a non-planar configuration. In certain embodiments, the first side 24 is non-perpendicular relative to (i) the top surface 32 of the retainer top 20, and (ii) the retainer bottom 22. In this embodiment, the first side 24 forms an acute angle 42 with the top surface 32, and forms an obtuse angle 44 with the retainer bottom 22. In non-exclusive alternative embodiments, the angle 42 between the first side 24 and the top surface 32 is less than 90 degrees and greater than approximately 30, 45, 60, 70 or 80 degrees. Still alternatively, the angle 42 between the first side 24 and the top surface 32 is equal to or greater than 90 degrees, or less than 30 degrees.

In non-exclusive alternative embodiments, the angle 44 between the first side 24 and the retainer bottom 22 is greater than 90 degrees and less than approximately 100, 110, 120, 135 or 150 degrees. Still alternatively, the angle 44 between the first side 24 and the retainer bottom 22 is equal to or less than 90 degrees, or greater than 150 degrees.

In the embodiment illustrated in FIG. 1, the second side 26 extends between the top surface 32 of the retainer top 20 and the retainer bottom 22. In one embodiment, the second side 26 can be substantially planar. Alternatively, the second side 26 can have a non-planar configuration. In the embodiment illustrated in FIG. 1, the second side 26 is non-perpendicular relative to the top surface 32 and the retainer bottom 22. In this embodiment, the second side 26 forms an acute angle 46 with the top surface 32, and forms an obtuse angle 48 with the retainer bottom 22. In non-exclusive alternative embodiments, the angle 46 between the second side 26 and the top surface 32 is less than 90 degrees and greater than approximately 30, 45, 60, 70 or 80 degrees. Still alternatively, the angle 46 between the second side 26 and the top surface 32 is equal to or greater than 90 degrees, or less than 30 degrees.

In non-exclusive alternative embodiments, the angle 48 between the second side 26 and the retainer bottom 22 is greater than 90 degrees and less than approximately 100, 110, 120, 135 or 150 degrees. Still alternatively, the angle 48 between the second side 26 and the retainer bottom 22 is equal to or less than 90 degrees, or greater than 150 degrees.

It is understood that although the first side 24 and the second side 26 can be substantially mirror images of one another, this is not necessary. For example, angle 42 and angle 46 can be identical to or different from one another. Somewhat similarly, angle 44 and angle 48 can be identical to or different from one another.

In one embodiment, the retainer back 28 is substantially planar. Alternatively, the retainer back 28 can have a non-planar configuration. The retainer back 28 can have a trapezoidal shape, as illustrated in FIG. 1. Alternatively, the retainer back 28 can have a different geometric shape, such as rectangular, elliptical, circular, rhomboidal, or any other suitable geometric configuration. In one embodiment, the retainer back 28 provides a surface that can rest against the user's midsection during use of the controller assembly 10.

In certain embodiments, the retainer front 30 can include one or more planar or non-planar surfaces that are oriented substantially opposite the retainer back 28. In one embodiment, the retainer front 30 is substantially parallel to the retainer back 28. Alternatively, the retainer front 30 can be non-parallel to the retainer back 28 or can have portions that are parallel and non-parallel to the retainer back 28.

The material(s) used to form the controller retainer 14 can vary. In one embodiment, the controller retainer 14 can be formed from a resilient plastic material, such as memory foam or another closed-cell or open-cell foam-based material. Alternatively, the controller retainer 14 can be formed from other suitable materials, such as wood, metal, ceramic or any other suitable natural or synthetic material(s), as non-exclusive examples.

Figure 2:
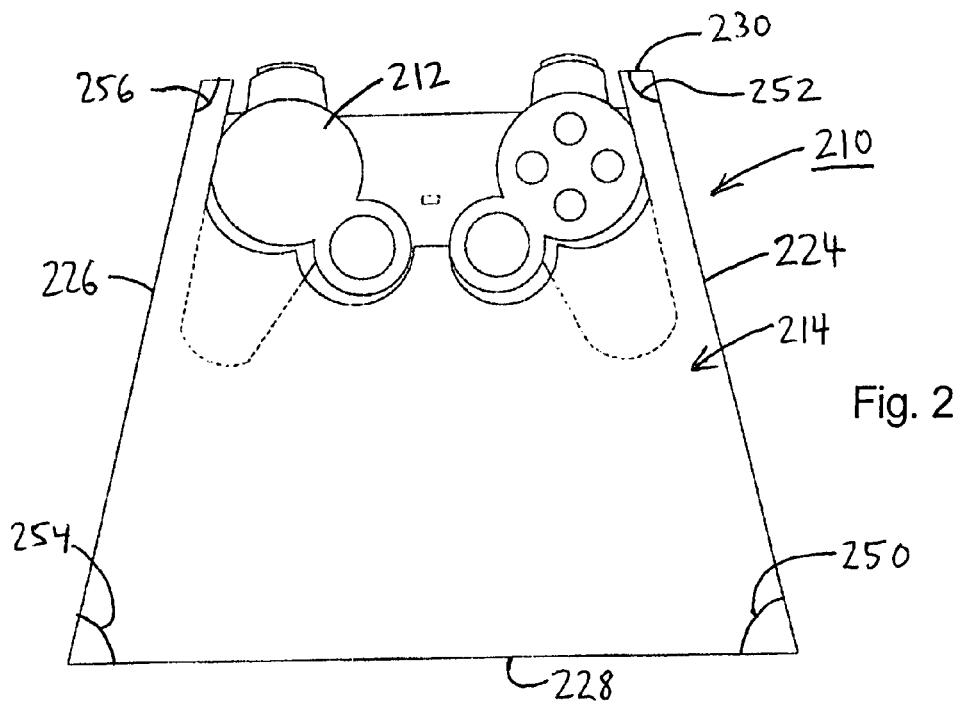
FIG. 2 is a top view of the video game remote controller assembly illustrated in FIG. 1.

FIG. 2 is a top view of one embodiment of the controller assembly 210. In this embodiment, the controller assembly 210 includes the controller 212 and the controller retainer 214. The controller 212 can be substantially similar to the controller 12 previously described. In the embodiment illustrated in FIG. 2, the controller retainer 214 includes a first side 224, a second side 226, a retainer back 228 and a retainer front 230. In one embodiment, the first side 224 forms an angle 250 that is less than 90 degrees relative to the retainer back 228. For example, in non-exclusive alternative embodiments, the angle 250 between the first side 224 and the retainer back 228 is less than 90 degrees and greater than approximately 30, 45, 60, 70 or 80 degrees. Still alternatively, the angle 250 between the first side 224 and the retainer back 228 can be equal to or greater than 90 degrees, or less than 30 degrees.

In certain embodiments, the first side 224 forms an angle 252 that is greater than 90 degrees relative to the retainer front 230. For example, in non-exclusive alternative embodiments, the angle 252 between the first side 224 and the retainer back 228 is greater than 90 degrees and less than approximately 100, 110, 120, 135 or 150 degrees. Still alternatively, the angle 252 between the first side 224 and the retainer front 230 can be less than or equal to 90 degrees, or greater than 150 degrees.

In one embodiment, the second side 226 forms an angle 254 that is less than 90 degrees relative to the retainer back 228. For example, in non-exclusive alternative embodiments, the angle 254 between the second side 226 and the retainer back 228 is less than 90 degrees and greater than approximately 30, 45, 60, 70 or 80 degrees. Still alternatively, the angle 254 between the second side 226 and the retainer back 228 can be equal to or greater than 90 degrees, or less than 30 degrees.

In certain embodiments, the second side 226 forms an angle 256 that is greater than 90 degrees relative to the retainer front 230. For example, in non-exclusive alternative embodiments, the angle 256 between the second side 226 and the retainer back 228 is greater than 90 degrees and less than approximately 100, 110, 120, 135 or 150 degrees. Still alternatively, the angle 256 between the second side 226 and the retainer front 230 can be less than or equal to 90 degrees, or greater than 150 degrees.

In the embodiment illustrated in FIG. 2, for example, the shape of the controller retainer 214 allows a user to more comfortably control the controller 212. For instance, because the first side 224 and the second side 226 form acute angles 250, 254 with the retainer back 228 and obtuse angles 252, 256 with the retainer front 230, the controller retainer 214 more naturally follows the position of the arms of the user. Stated another way, when the retainer back 228 is abutted against the midsection of seated user, the forearms of the user comfortably extend along the sides 224, 226 toward the controller 212. Greater comfort for the user can allow for a longer duration of use of the controller assembly 210, less strain and/or less fatigue.

Figure 3A:
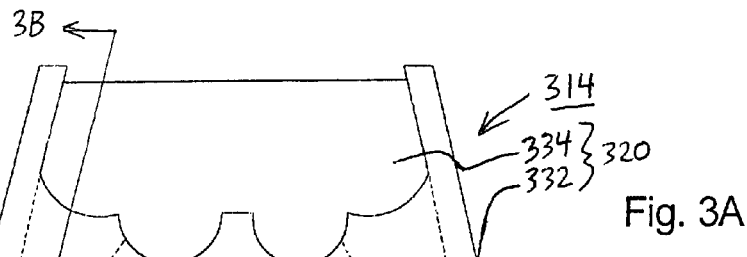
FIG. 3A is a top view of the controller retainer illustrated in FIG. 1 with the video game remote controller omitted for clarity.

FIG. 3A is a top view of one embodiment of the controller retainer 314 with the controller 12 (illustrated in FIG. 1, for example) omitted for clarity. In this embodiment, the controller retainer 314 includes a retainer top 320 having a top surface 332 and a controller receiver 334. Further, in the embodiment illustrated in FIG. 3A, the controller receiver 334 includes a plurality of receiver cavities 358 (two receiver cavities 358 are illustrated in phantom in FIG. 3A). In alternative embodiments, the controller receiver 334 can include fewer than or greater than two receiver cavities 358.

The receiver cavities 358 each receives a portion of the controller 12. In certain embodiments, the receiver cavities 358 can encircle a portion of the controller 12. In these embodiments, the receiver cavities 358 securely retain the controller 12, allowing the controller retainer 314 to further stabilize the controller 12 during use by the user. Because of the shape of the controller retainer 314 as provided herein, movement of the controller retainer 314 during use is inhibited. As a consequence, in certain embodiments, overall unwanted movement of the controller 12 relative to the user is likewise inhibited, which can result in fewer errors by the user during usage.

Figure 3B:
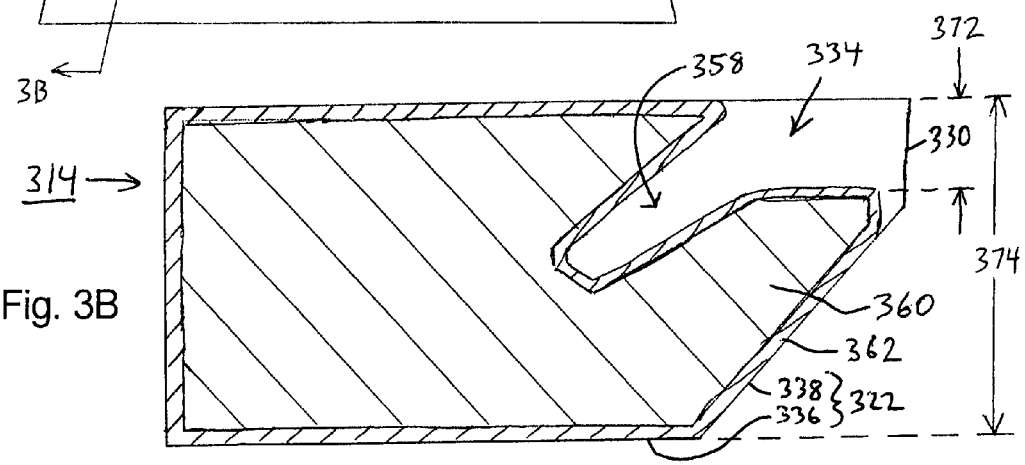
FIG. 3B is a cross-sectional view of the controller retainer taken on line 3B-3B in FIG. 3A.

FIG. 3B is a cross-sectional view of the controller retainer 314 taken on line 3B-3B in FIG. 3A. FIG. 3B illustrates that the receiver cavity 358 can have a contour that is substantially similar to a contour of a portion of the controller 12 (illustrated in FIG. 1, for example). In this embodiment, the controller 12 can snugly fit within the controller receiver 334 so that movement of the controller 12 relative to the controller retainer 314 is inhibited.

Further, in this embodiment, the controller retainer 314 can include a retainer body 360 and a retainer cover 362 that partially or fully covers the retainer body 360. The retainer cover 362 can be removable or the retainer cover 362 can be permanently or semi-permanently secured to the retainer body 360. The retainer cover 362 can be formed from any suitable material, including various natural or synthetic textiles and/or fabrics, as non-exclusive examples.

Additionally, in this embodiment, the retainer bottom 322 includes a first bottom surface 336 and an adjacent second bottom surface 338. In this embodiment, the second bottom surface 338 is obtusely angled relative to the first bottom surface 336 and/or the retainer front 330. This configuration promotes the user to hold the controller retainer 314 in a more relaxed manner, decreasing the propensity for or completely avoiding a "claw-like" grip on the controller 12, which can occur absent one or more of the configurations of the controller retainer 314 described herein.

Further, in certain embodiments, the controller retainer 314 raises the controller 12 above the support surface 11 (illustrated in FIG. 1). For example, the controller retainer 314 can be configured to raise the controller to a comfortable level above the lap of the user, to reduce arm and/or shoulder fatigue of the user. In one embodiment, the controller receiver 334 has a height 372 that is less than a height 374 of the controller retainer 314. In non-exclusive alternative embodiments, the height 372 of the controller receiver 334 is less than approximately 75%, 50%, 40%, 30% or 25% of the height 374 of the controller retainer 314.

Further, the controller retainer 314 has a retainer volume, and the controller 12 has a controller volume. In certain embodiments, the retainer volume is greater than the controller volume. In non-exclusive alternative embodiments, the retainer volume is at least approximately 25%, 50%, 100%, 150%, 200%, 300% or 500% greater than the controller volume. In these embodiments, because the controller retainer 314 has a greater volume than the controller 12, and because the controller 12 is secured to the controller retainer 314, movement of the controller retainer 314 is reduced and stability of the controller 12 is increased during use. In an alternative embodiment, the controller volume can be greater than the retainer volume.

Figure 3C:
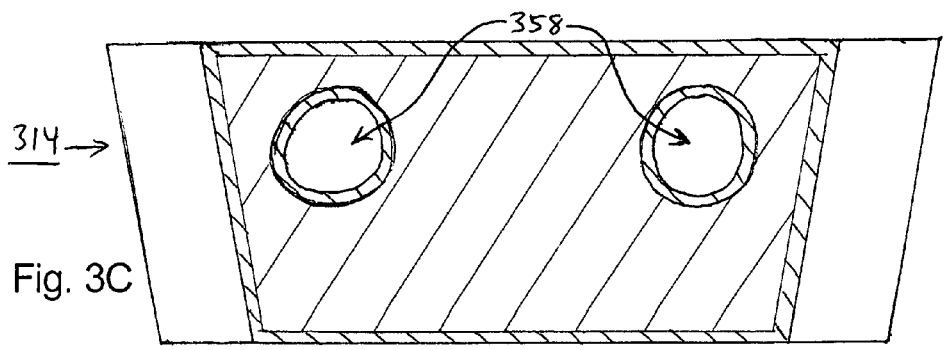
FIG. 3C is a cross-sectional view of the controller retainer taken on line 3C-3C in FIG. 3A.

FIG. 3C is a cross-sectional view of the controller retainer 314 taken on line 3C-3C in FIG. 3A. In this embodiment, the receiver cavities 358 can have a substantially circular or elliptical cross-sectional shape. In alternative embodiments, the receiver cavities 358 can have any suitable cross-sectional shape that accommodates and receives the particular controller 12 (illustrated in FIG. 1, for example) to form a snug fit.

Figure 4A:
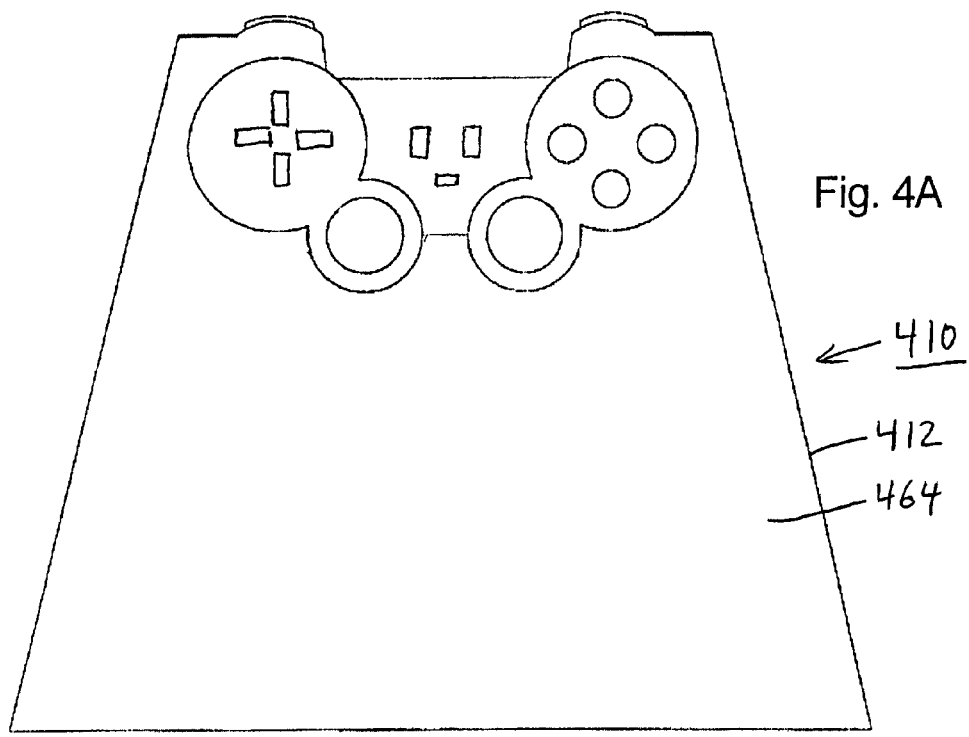
FIG. 4A is a top view of another embodiment of a video game remote controller assembly having features of the present invention.

FIG. 4A is a top view of another embodiment of the controller assembly 410. In this embodiment, the controller assembly 410 only includes a controller 412, and omits the controller retainer 14 (illustrated in FIG. 1). In one embodiment, the controller 412 includes a controller body 464 that basically adopts the shape of one of the controller retainers described herein. Thus, the controller 412 and the controller retainer are essentially formed as an integral unit. With this design, the controller 412 provides one or more of the benefits previously described without the need for a separate controller retainer.

Figure 4B:
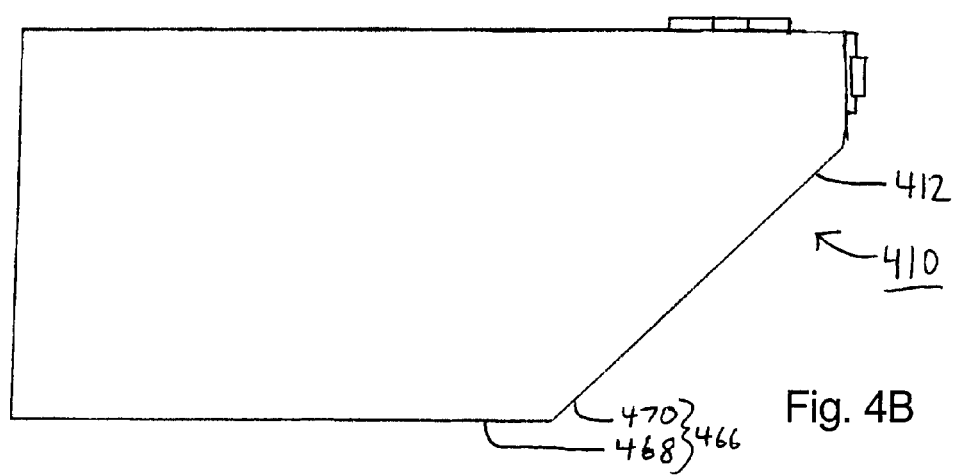
FIG. 4B is a side view of the video game remote controller assembly illustrated in FIG. 4A.

FIG. 4B is a side view of the controller assembly 410 illustrated in FIG. 4A. In this embodiment, the controller 412 includes a controller bottom 466 having a first bottom surface 468 and a second bottom surface 470 that is angled relative to the first bottom surface 468 in a somewhat similar manner as previously described relative to one or more embodiments of the controller retainer. This configuration promotes the user to hold the controller 412 in a more relaxed manner, decreasing the propensity for or completely avoiding a "claw-like" grip on the controller 412.

It is understood that although a number of different embodiments of the video game controller assembly and the controller retainer have been illustrated and described herein, one or more features of any one embodiment can be combined with one or more features of one or more of the other embodiment, provided that such combination satisfies the intent of the present invention.

While the particular video game controller assemblies as shown and disclosed herein are fully capable of obtaining the objects and providing the advantages herein before stated, it is to be understood that they are merely illustrative of the presently preferred embodiments of the invention and that no limitations are intended to the details of the methods, construction or design herein shown and described.

What is claimed is:

1. A controller retainer for a video game controller, the controller retainer comprising:
    a retainer top including a controller receiver that receives the video game controller;
    a retainer bottom that is opposite the retainer top;
    a substantially planar first side that extends between the retainer top and the retainer bottom;
    a substantially planar second side that is opposite the first side, the second side extending between the retainer top and the retainer bottom, the second side being spaced apart from the first side, the second side being non-parallel relative to the first side; and
    a retainer back that extends between the first side and the second side and is positioned away from the controller receiver, the retainer back extending between the retainer top and the retainer bottom, the retainer back forming an angle with at least one of the first side and the second side that is less than 90 degrees.

2. The controller retainer of claim 1 wherein the retainer back forms an angle with each of the first side and the second side that is less than 90 degrees.

3. The controller retainer of claim 1 further comprising a retainer front that extends between the first side and the second side and is positioned adjacent to the controller receiver, the retainer front extending between the retainer top and the retainer bottom, the retainer front forming an angle with at least one of the first side and the second side that is greater than 90 degrees.

4. The controller retainer of claim 1 wherein the retainer bottom includes a first surface and an adjacent second surface, the second surface being positioned at an angle that is greater than 90 degrees relative to the first surface.

5. The controller retainer of claim 4 wherein the second surface is substantially planar.

6. The controller retainer of claim 4 further comprising a retainer front that extends between the first side and the second side and is positioned adjacent to the controller receiver, wherein the second surface is positioned at an angle that is greater than 90 degrees relative to the retainer front.

7. The controller retainer of claim 1 wherein the retainer bottom includes a first surface and an adjacent second surface, the second surface being positioned at an angle that is greater than 120 degrees relative to the first surface.

8. The controller retainer of claim 1 wherein at least one of the first side and the second side forms an angle that is greater than 90 degrees relative to the retainer bottom.

9. The controller retainer of claim 1 wherein the controller receiver includes a cavity that substantially encircles at least a portion of the controller.

10. The controller retainer of claim 1 wherein the controller retainer has a retainer height measured in a first direction between the retainer top and the retainer bottom, and the controller receiver has a receiver height measured in the first direction that is less than approximately 50% of the retainer height.

11. A controller retainer for a video game controller, the controller retainer comprising:
    a retainer top including a controller receiver that receives the video game controller;
    a retainer bottom that is opposite the retainer top;
    a retainer back that extends between the retainer top and the retainer bottom, the retainer back being positioned away from the controller receiver;
    a substantially planar first side that extends between the retainer top and the retainer bottom, the first side forming an angle with the retainer back that is less than 90 degrees; and
    a substantially planar second side that is spaced apart and opposite the first side, the second side extending between the retainer top and the retainer bottom, the second side being non-parallel relative to the first side.

12. The controller retainer of claim 11 wherein the second side forms an angle with the retainer back that is less than 90 degrees.

13. The controller retainer of claim 11 further comprising a retainer front that extends between the first side and the second side and is positioned adjacent to the controller receiver, the retainer front extending between the retainer top and the retainer bottom, the retainer front forming an angle with at least one of the first side and the second side that is greater than 90 degrees.

14. The controller retainer of claim 11 wherein the retainer back is substantially planar.

15. The controller retainer of claim 11 wherein the retainer bottom includes a first surface and an adjacent second surface, the second surface being positioned at an angle that is greater than 90 degrees relative to the first surface.

16. The controller retainer of claim 15 wherein the second surface is substantially planar.

17. The controller retainer of claim 15 further comprising a retainer front that extends between the first side and the second side and is positioned adjacent to the controller receiver, wherein the second surface is positioned at an angle that is greater than 90 degrees relative to the retainer front.

18. The controller retainer of claim 11 wherein at least one of the first side and the second side forms an angle that is greater than 90 degrees relative to the retainer bottom.

19. The controller retainer of claim 11 wherein the controller receiver includes a cavity that substantially encircles at least a portion of the controller.

20. The controller retainer of claim 11 wherein the controller retainer has a retainer height measured in a first direction between the retainer top and the retainer bottom, and the controller receiver has a receiver height measured in the first direction that is less than approximately 50% of the retainer height.

21. A controller retainer for a video game controller, the controller retainer comprising:
   a retainer top including a controller receiver that receives the video game controller, the controller receiver including a plurality of spaced apart cavities that substantially encircle at least a portion of the controller;
   a retainer bottom that is opposite the retainer top, the retainer bottom including a first bottom surface and a second bottom surface that is positioned at an angle relative to the first bottom surface, the angle being greater than 90 degrees;
   a substantially planar retainer back that extends between the retainer top and the retainer bottom, the retainer back being positioned away from the controller receiver;
   a substantially planar first side that extends between the retainer top and the retainer bottom, the first side forming an angle with the retainer back that is less than 90 degrees;
   a substantially planar second side that is spaced apart and opposite the first side, the second side extending between the retainer top and the retainer bottom, the second side forming an angle with the retainer back that is less than 90 degrees; and
   a retainer front that extends between the first side and the second side and is positioned adjacent to the controller receiver, the retainer front extending between the retainer top and the retainer bottom, the retainer front forming an angle with at least one of the first side and the second side that is greater than 90 degrees.

22. A controller retainer for a video game controller, the controller retainer comprising:
   a retainer top including a controller receiver that receives the video game controller, the controller receiver including a cavity that substantially encircles at least a portion of the video game controller;
   a retainer bottom that is opposite the retainer top;
   a substantially planar first side that extends between the retainer top and the retainer bottom; and
   a substantially planar second side that is opposite the first side, the second side extending between the retainer top and the retainer bottom, the second side being spaced apart from the first side, the second side being non-parallel relative to the first side.

23. The controller retainer of claim 22 wherein the controller receiver includes a plurality of spaced apart cavities that substantially encircle at least a portion of the controller.

* * * * *